US012734511B2

(12) United States Patent
Yang et al.

(10) Patent No.: US 12,734,511 B2
(45) Date of Patent: Sep. 15, 2026

(54) SILICON-ALUMINUM MOLECULAR SIEVE CATALYST, AND PREPARATION AND APPLICATION THEREOF

(71) Applicants: CHINA PETROLEUM & CHEMICAL CORPORATION, Beijing (CN); SHANGHAI RESEARCH INSTITUTE OF PETROCHEMICAL TECHNOLOGY, SINOPEC, Shanghai (CN)

(72) Inventors: Weimin Yang, Shanghai (CN); Darui Wang, Shanghai (CN); Hongmin Sun, Shanghai (CN); Wei Liu, Shanghai (CN); Mingyao Huan, Shanghai (CN); Mingwei Xue, Shanghai (CN); Junlin He, Shanghai (CN)

(73) Assignees: CHINA PETROLEUM & CHEMICAL CORPORATION, Beijing (CN); SHANGHAI RESEARCH INSTITUTE OF PETROCHEMICAL TECHNOLOGY, SINOPEC, Shanghai (CN)

( * ) Notice: Subject to any disclaimer, the term of this patent is extended or adjusted under 35 U.S.C. 154(b) by 634 days.

(21) Appl. No.: 18/250,320

(22) PCT Filed: Oct. 25, 2021

(86) PCT No.: PCT/CN2021/125964

§ 371 (c)(1),
(2) Date: Apr. 24, 2023

(87) PCT Pub. No.: WO2022/089338

PCT Pub. Date: May 5, 2022

(65) Prior Publication Data

US 2023/0398524 A1 Dec. 14, 2023

(30) Foreign Application Priority Data

Oct. 26, 2020 (CN) .......................... 202011158111.7

(51) Int. Cl.

| | |
|---|---|
| ***B01J 29/40*** | (2006.01) |
| ***B01J 29/46*** | (2006.01) |
| ***B01J 35/36*** | (2024.01) |
| ***B01J 35/40*** | (2024.01) |
| ***B01J 35/45*** | (2024.01) |
| ***B01J 35/70*** | (2024.01) |
| ***B01J 35/77*** | (2024.01) |
| ***B01J 37/00*** | (2006.01) |
| ***B01J 37/04*** | (2006.01) |
| ***B01J 37/06*** | (2006.01) |
| ***B01J 37/08*** | (2006.01) |
| ***C07C 2/66*** | (2006.01) |
| ***C07C 15/073*** | (2006.01) |

(52) U.S. Cl.
CPC ............... *B01J 29/40* (2013.01); *B01J 35/36* (2024.01); *B01J 35/40* (2024.01); *B01J 35/70* (2024.01); *B01J 35/77* (2024.01); *B01J 37/0018* (2013.01); *B01J 37/04* (2013.01); *B01J 37/06* (2013.01); *B01J 37/08* (2013.01); *B01J 2235/15* (2024.01); *B01J 2235/30* (2024.01)

(58) Field of Classification Search
CPC ............ B01J 29/40; B01J 35/36; B01J 35/77; B01J 35/70; B01J 35/40; B01J 37/0018; B01J 37/04; B01J 37/06; B01J 37/08
See application file for complete search history.

(56) References Cited

U.S. PATENT DOCUMENTS

2009/0269265 A1 10/2009 Ando et al.

FOREIGN PATENT DOCUMENTS

| | | | | |
|---|---|---|---|---|
| CN | 102441414 A | | 5/2012 | |
| CN | 103007983 A | | 4/2013 | |
| CN | 103818925 A | | 5/2014 | |
| CN | 103878013 A | | 6/2014 | |
| CN | 104549437 A | | 4/2015 | |
| CN | 104646047 A | | 5/2015 | |
| CN | 104759290 A | | 7/2015 | |
| CN | 106807324 A | | 6/2017 | |
| CN | 107511170 A | | 12/2017 | |
| CN | 107512729 A | * | 12/2017 | ............... C07C 2/86 |
| FR | 3092104 A1 | | 7/2020 | |
| JP | 2009262098 A | | 11/2009 | |
| KR | 20190101162 A | | 8/2019 | |
| RU | 2281163 C1 | | 8/2006 | |
| RU | 2410368 C1 | | 1/2011 | |

OTHER PUBLICATIONS

Zhai et al., Topics in Catalysis, (2006), 39(3-4), p. 227-235.*
Corma, A. et al., "Alkylation of Benzene with Short-Chain Olefins over MCM-22 Zeolite: Catalytic Behaviour and Kinetic Mechanism", Journal of Catalysis, May 15, 2000, vol. 192, No. 1, pp. 163-173.

* cited by examiner

*Primary Examiner* — Yong L Chu
(74) *Attorney, Agent, or Firm* — NKL Law; Allen Xue

(57) ABSTRACT

An aluminosilicate molecular sieve catalyst, its preparation and application thereof are provided. The catalyst shows a desorption curve having three peaks P1, P2 and P3 in its $NH_3$-TPD pattern. The desorption temperatures corresponding to the summits of the three peaks P1, P2 and P3 are respectively in a range of 180-220° C., 250-290° C. and 370-410° C. The catalyst shows a higher activity, selectivity and stability when used for producing alkylaromatic hydrocarbons by gas-phase alkylation of aromatics with olefins.

17 Claims, 4 Drawing Sheets

SILICON-ALUMINUM MOLECULAR SIEVE CATALYST, AND PREPARATION AND APPLICATION THEREOF

CROSS REFERENCE TO RELATED APPLICATIONS

This application is a U.S. national stage entry of PCT International Application No. PCT/CN2021/125964, filed on Oct. 25, 2021, which claims priority from a Chinese patent application No. 202011158111.7, titled "a catalyst for alkylation of benzene with ethylene, its preparation and application thereof", filed on Oct. 26, 2020, the contents of which are incorporated herein by reference in its entirety.

TECHNICAL FIELD

The present application relates to the field of aromatics alkylation catalysts, particularly to an aluminosilicate molecular sieve catalyst useful for alkylation of aromatics with olefins, its preparation and application thereof.

BACKGROUND ART

Ethylbenzene is an important basic organic raw material and is mainly used for producing styrene, which has wide applications. For example, styrene is an important monomer for producing polystyrene, styrene-butadiene rubber, ABS, SBS and the like, and is also applied in pharmaceutical industry, coating industry and textile industry.

Ethylbenzene is mainly produced by the alkylation reaction between benzene and ethylene, and in practical catalytic reaction process, gas-phase alkylation of benzene with ethylene is a complex reaction system with coexisting serial and parallel side reactions, and in addition to the ethylbenzene, byproducts such as diethylbenzene, triethylbenzene, toluene, xylene, propylbenzene, methyl ethylbenzene, butylbenzene and the like may be generated. Among those byproducts, xylene has a boiling point close to that of ethylbenzene and is difficult to be effectively removed by fractional distillation, so that the control of the xylene content in the alkylation product is particularly important. In addition, to improve the yield of ethylbenzene in industrial production, polyethylbenzene (e.g. diethylbenzene and triethylbenzene) materials are separated from the alkylation product, and then converted to ethylbenzene through transalkylation reaction. Thus, the reduction of the polyethylbenzene content in the alkylation product may lead to a reduction of the load of subsequent transalkylation reaction, and has important significance for energy conservation and efficiency improvement of enterprises.

Benzene and ethylene alkylation catalysts used in industry have certain requirements on shape and mechanical strength, and thus a large amount of binder needs to be added in the process of shaping the molecular sieve catalyst. The addition of the large amount of binder increases the mechanical strength of the catalyst, but also brings some negative effects, such as dilution of active centers of the catalyst, blockage of pore channels of the molecular sieve, and causing more side reactions, thereby resulting in a reduction of product purity. To address the negative effects of binders, methods for producing binderless catalysts are disclosed in prior arts.

CN107512729B discloses a method for producing a binderless ZSM-5 molecular sieve, comprising the following steps: a) providing a synthesized ZSM-5 molecular sieve; b) mixing the synthesized ZSM-5 molecular sieve with a binder, a pore-forming agent and an aqueous acid solution, shaping and drying to obtain a ZSM-5 molecular sieve precursor; the binder is at least one selected from silica sol or alumina; wherein the silica sol provides a first silicon source, and the alumina provides a first aluminum source; c) crystallizing a mixture of the ZSM-5 molecular sieve precursor, a second silicon source, a second aluminum source, an alkali source, an organic template and water, separating the resulting solid product, and drying to obtain the binderless ZSM-5 molecular sieve.

In the methods for producing binderless molecular sieve catalysts currently reported in prior arts, a certain amount of molecular sieve powder is typically added in the shaping process, which means that such molecular sieve powder needs to be prepared in advance, and the operation steps and production cost are undoubtedly increased.

Disclosure of the Invention

An object of the present application is to provide an aluminosilicate molecular sieve catalyst useful for alkylation of aromatics with olefins, its preparation and application thereof. When used for producing alkyl aromatics by gas-phase alkylation of aromatics with olefins, the catalyst has high activity, selectivity and stability, and can significantly reduce the content of byproducts.

To achieve the above object, in one aspect, the present application provides an aluminosilicate molecular sieve catalyst, which shows a desorption curve having three peaks P1, P2 and P3 in its $NH_3$-TPD pattern, and the desorption temperatures corresponding to the summits of the three peaks P1, P2 and P3 are respectively in a range of 180-220° C., 250-290° C. and 370-410° C.

Preferably, the peak heights H1, H2 and H3 of the three peaks P1, P2 and P3 satisfy the relationship H1>H2>H3.

More preferably, the peak heights H1, H2 and H3 of the three peaks P1, P2 and P3 satisfy the following relationships:

$$H2/H1=(0.5\text{-}0.8):1;$$

$$H3/H2=(0.8\text{-}0.9):1; \text{ and}$$

$$H3/H1=(0.4\text{-}0.7):1.$$

In another aspect, the present application provides a method for producing an aluminosilicate molecular sieve catalyst, comprising the steps of:

1) mixing a template, a silicon source, a first aluminum source and water while heating to obtain a first mixture;
2) mixing the first mixture, silicon powder and a second aluminum source to obtain a second mixture;
3) shaping the second mixture to obtain a third mixture;
4) contacting the third mixture, an alkali source and a regulator to obtain a fourth mixture, wherein the regulator is a polyhydroxy high molecular compound; and
5) treating the fourth mixture to obtain the aluminosilicate molecular sieve catalyst, wherein the treatment comprises calcination.

Preferably, the silicon powder used in step 2) comprises two types of silica particles having different sizes, the sizes of the two types of silica particles are respectively in a range of 0.1-2 μm and 4-12 μm, and the mass ratio of the two types of silica particles is (0.5-2.0):1.

In yet another aspect, the present application provides a process for gas-phase alkylation of an aromatic hydrocarbon with an olefin, comprising the step of subjecting the aromatic hydrocarbon and the olefin to an alkylation reaction in the presence of the catalyst of the present application or a catalyst obtained by the method of the present application, to obtain an alkylaromatic hydrocarbon.

The aluminosilicate molecular sieve catalyst of the present application provides the following benefits:

1. The inventors of the present application have found through research that the acidity distribution of an aluminosilicate molecular sieve catalyst, particularly a binderless ZSM-5 molecular sieve catalyst, has a significant impact on the catalytic performance of the catalyst for catalyzing the gas-phase alkylation reaction of aromatics with olefins, particularly on the yield of byproducts. The inventors of the present application have also found through research that when the $NH_3$-TPD desorption curve of the aluminosilicate molecular sieve catalyst showed three peaks, especially when the height of the three peaks showed a specific proportional relationship from low to high desorption temperatures, it is favorable for improving the performance for catalyzing the gas-phase alkylation of aromatics with olefins, and particularly favorable for reducing the content of by-products, such as xylene and polyethylbenzene, in the product. Furthermore, where the grain size of the catalyst has a bimodal distribution, there is a synergistic effect and relay effect on the diffusion and reaction of reactant molecules, so that the diffusion performance of the catalyst is matched with the reaction performance thereof, and the content of by-products in the product can be obviously reduced while improving the activity and the selectivity of the catalyst.
2. In the method for producing the catalyst of the present application, no preprepared molecular sieve powder is required to be added in the production process, instead a polyhydroxy high molecular compound regulator is employed, and preferably silicon powders having two different particle sizes are used, so that the catalyst obtained has specific acidity distribution and crystal grain distribution. The catalyst obtained by the method of the present application is particularly suitable for producing alkylaromatic hydrocarbons by gas-phase alkylation of aromatics with olefins, and has high activity, selectivity and stability.
3. When the catalyst is used in the gas-phase alkylation of benzene with ethylene, the content of xylene in the alkylation product can be reduced to 500 ppm or lower, and the mass content of diethylbenzene and triethylbenzene can be reduced to 8% or lower.

Other characteristics and advantages of the present application will be described in detail in the detailed description hereinbelow.

BRIEF DESCRIPTION OF THE DRAWINGS

The drawings, forming a part of the present description, are provided to help the understanding of the present application, and should not be considered to be limiting. The present application can be interpreted with reference to the drawings in combination with the detailed description hereinbelow. In the drawings.

DETAILED DESCRIPTION OF THE INVENTION

Figure 1:
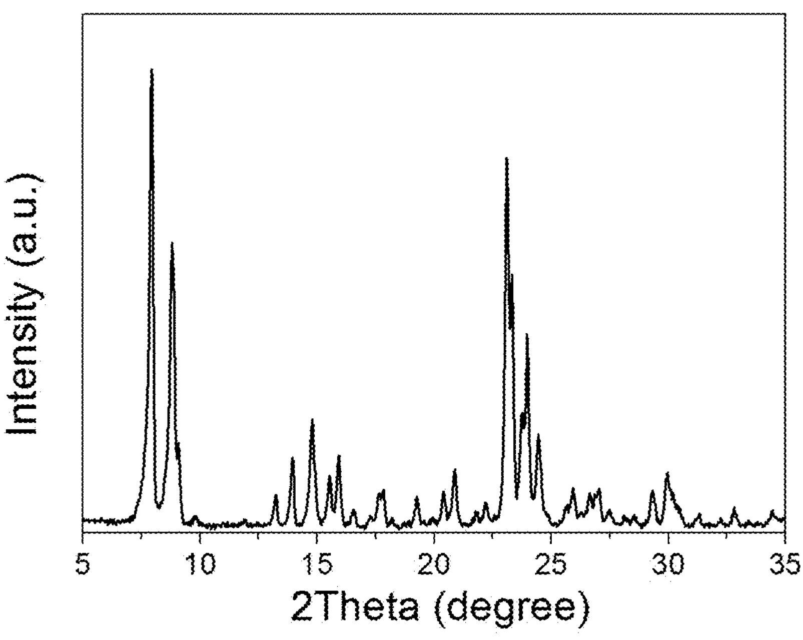
FIG. 1 shows an XRD pattern of the aluminosilicate molecular sieve catalyst obtained in Example 1 of the present application.

The present application will be further described hereinafter in detail with reference to the drawing and specific embodiments thereof. It should be noted that the specific embodiments of the present application are provided for illustration purpose only, and are not intended to be limiting in any manner.

Any specific numerical value, including the endpoints of a numerical range, described in the context of the present application is not restricted to the exact value thereof, but should be interpreted to further encompass all values close to said exact value, for example all values within ±5% of said exact value. Moreover, regarding any numerical range described herein, arbitrary combinations can be made between the endpoints of the range, between each endpoint and any specific value within the range, or between any two specific values within the range, to provide one or more new numerical range(s), where said new numerical range(s) should also be deemed to have been specifically described in the present application.

Unless otherwise stated, the terms used herein have the same meaning as commonly understood by those skilled in the art; and if the terms are defined herein and their definitions are different from the ordinary understanding in the art, the definition provided herein shall prevail.

In the present application, the term "polyhydroxy high molecular compound" refers to a high molecular compound having a plurality of hydroxyl groups within its molecule, including but not limited to hydroxyethylcellulose, hydroxymethylcellulose, hydroxypropylmethylcellulose, methylcellulose, casein, or gum arabic.

In the present application, the term "acidic molecular sieve" has the meaning commonly understood in the art and refers to a molecular sieve having B acid and/or L acid sites.

In the present application, unless otherwise indicated, the pressures given are gauge pressures.

In the context of the present application, in addition to those matters explicitly stated, any matter or matters not mentioned are considered to be the same as those known in the art without any change. Moreover, any of the embodiments described herein can be freely combined with another one or more embodiments described herein, and the technical solutions or ideas thus obtained are considered as part of the original disclosure or original description of the present application, and should not be considered to be a new matter that has not been disclosed or anticipated herein, unless it is clear to the person skilled in the art that such a combination is obviously unreasonable.

All of the patent and non-patent documents cited herein, including but not limited to textbooks and journal articles, are hereby incorporated by reference in their entirety.

As described above, in a first aspect, the present application provides an aluminosilicate molecular sieve catalyst, which shows a desorption curve having three peaks P1, P2 and P3 in its $NH_3$-TPD pattern, and the desorption temperatures corresponding to the summits of the three peaks P1, P2 and P3 are respectively in a range of 180-220° C., 250-290° C. and 370-410° C., preferably in a range of 190-210° C., 260-280° C. and 380-400° C.

In a preferred embodiment, the peak heights H1, H2 and H3 of the three peaks P1, P2 and P3 satisfy the relationship H1>H2>H3, more preferably the peak heights H1, H2 and H3 satisfy the following relationships:

$$H2/H1=(0.5\text{-}0.8):1;$$

$$H3/H2=(0.8\text{-}0.9):1;\text{ and}$$

$$H3/H1=(0.4\text{-}0.7):1.$$

According to the present application, the desorption temperature in the $NH_3$-TPD pattern are divided into three ranges, which are 100-240° C., 240-300° C. and 300-500° C., respectively, and the integral areas of the desorption curve within the three temperature ranges correspond to the weak acid content S1, the medium-strong acid content S2 and the strong acid content S3 of the catalyst, respectively. Preferably, the weak acid content S1, the medium-strong acid content S2 and the strong acid content S3 of the catalyst satisfy the following relationship:

S2/S1=(0.38-0.52):1, more preferably, S2/S1=(0.4-0.5):1;

S2/S3=(0.32-0.58):1, more preferably, S2/S3=(0.35-0.55):1; and

S3/S1=(0.8-1.2):1, more preferably, S3/S1=(0.9-1.1):1.

In a preferred embodiment of the catalyst, the proportion of the weak acid content S1 to the total acid content (i.e. the total of the weak acid content, the medium-strong acid content and the strong acid content) of the catalyst is 40-50%, the proportion of the medium-strong acid content S2 to the total acid content is 15-25%, and the proportion of the strong acid content S3 to the total acid content is 35-45%, wherein the proportions of the weak acid content S1, the medium-strong acid content S2 and the strong acid content S3 to the total acid content are respectively calculated from the proportions of the integral areas of the $NH_3$-TPD desorption curve of the catalyst within the temperature ranges of 100-240° C., 240-300° C. and 300-500° C. to the total integral area in the temperature range of 100-500° C.

In a preferred embodiment, the proportion of the super-strong acid content to the total acid content of the catalyst is less than 5%, preferably less than 3%, wherein the proportion of the super-strong acid content to the total acid content is calculated from the proportion of the integral area of the desorption curve in the temperature range above 500° C. in the $NH_3$-TPD pattern of the catalyst to the total integral area of the desorption curve within the temperature range of 100-500° C. in the $NH_3$-TPD pattern of the catalyst.

In a preferred embodiment, the aluminosilicate molecular sieve catalyst is a binderless aluminosilicate molecular sieve catalyst, more preferably, the aluminosilicate molecular sieve is an acidic molecular sieve having a ten- or twelve-membered ring pore structure, and particularly preferably, the aluminosilicate molecular sieve is a ZSM-5 molecular sieve.

In a preferred embodiment, no additional modifying metallic or non-metallic component, such as zinc, magnesium, calcium, iron, cobalt, nickel, phosphorus, lanthanum, copper, zirconium, chromium, manganese, silver, ruthenium, palladium, platinum, titanium, tin, strontium, barium, vanadium, lithium, and the like, is supported on the aluminosilicate molecular sieve catalyst.

In a preferred embodiment, the aluminosilicate molecular sieve catalyst has two different sizes of crystalline grains, which are in a range of 10-300 nm and 400-1600 nm, respectively. More preferably, the number of crystalline grains in the range of 10 to 300 nm accounts for 5-60%, preferably 30-60%, of the total number of crystalline grains; the number of crystalline grains in the range of 400-1600 nm accounts for 40-95%, preferably 40-70%, of the total number of the crystalline grains.

In a preferred embodiment, the isolated aluminum content of the catalyst is 97.5-100%, preferably 99-100%. According to the present application, the isolated aluminum content can be measured as follows:

$$\text{Isolated aluminum content}=(1-2\times C_{cobalt}/C_{aluminum})\times 100\%,$$

wherein Co—Na type catalysts are prepared by ion exchange, $C_{cobalt}$ and $C_{aluminum}$ respectively refer to the Co content and Al content in the catalyst as measured by ICP test.

In a preferred embodiment, the mechanical strength of the aluminosilicate molecular sieve catalyst is 100-170 N/cm, more preferably 110-160 N/cm.

In a preferred embodiment, the aluminosilicate molecular sieve catalyst has a $SiO_2/Al_2O_3$ molar ratio of from 30 to 400.

In a second aspect, the present application provides a method for producing an aluminosilicate molecular sieve catalyst, comprising the steps of:

(1) mixing a template, a silicon source, a first aluminum source and water while heating to obtain a first mixture;

(2) mixing the first mixture, silicon powder and a second aluminum source to obtain a second mixture;

(3) shaping the second mixture to obtain a third mixture;

(4) contacting the third mixture, an alkali source and a regulator to obtain a fourth mixture, wherein the regulator is a polyhydroxy high molecular compound;

(5) treating the fourth mixture to obtain the aluminosilicate molecular sieve catalyst, wherein the treatment comprises calcination.

In a preferred embodiment, the template used in step 1) is one or more selected from the group consisting of tetrapropylammonium hydroxide, tetrapropylammonium bromide, tetraethylammonium hydroxide, and tetraethylammonium bromide; the silicon source is one or more selected from the group consisting of silica sol, white carbon black, tetraethyl silicate and silicon powder; the first aluminum source is one or more selected from the group consisting of aluminum chloride, aluminum nitrate, aluminum sulfate, aluminum isopropoxide and pseudo-boehmite.

In a preferred embodiment, the molar ratios between the template, the silicon source, the first aluminum source, and water in step 1) are respectively as follows: template:silicon source=(0.05-1.0):1, silicon source:first aluminum source=(30-400):1, water:silicon source=(3-12):1, wherein the silicon source is calculated by $SiO_2$ and the first aluminum source is calculated by $Al_2O_3$.

In a preferred embodiment, the process of mixing the template, the silicon source, the first aluminum source and water while heating in step 1) to obtain the first mixture is carried out by: mixing the template, the silicon source, the first aluminum source and water in a closed container while stirring for 4-20 hours at a temperature of 90-150° C.

In a preferred embodiment, the silicon powder used in step 2) comprises two types of silica particles having different sizes, wherein the sizes of the two types of silica particles are respectively in a range of 0.1-2 μm and 4-12 μm, and the mass ratio of the two types of silica particles is (0.5-2.0):1; the second aluminum source is one or more selected from the group consisting of aluminum chloride, aluminum nitrate, aluminum sulfate, aluminum alkoxide, pseudo-boehmite and aluminum hydroxide.

In a preferred embodiment, the ratios between the first mixture, the silicon powder and the second aluminum source used in step 2) are respectively as follows: the weight ratio of the first mixture to the silicon powder is (0.2-0.8):1; the molar ratio of the silicon powder to the second aluminum source is (30-400):1, wherein the silicon powder is calculated by $SiO_2$, and the second aluminum source is calculated by $Al_2O_3$.

In the present application, there is no particular limitation to the way of the shaping in step 3), and the shaping of the catalyst may be performed by methods commonly used in the art, for example, by extrusion molding.

According to the present application, in step 3), the third mixture can be formed into various shapes in view of the need, for example, the third mixture can be formed into strips, of which the section can be in a circular shape, a gear shape, a trefoil shape, a four-leaf clover shape, or a honeycomb shape. In a preferred embodiment, the third mixture has a diameter of 1.0 to 6.0 mm and a length of 3 to 10 mm.

In a preferred embodiment, the alkali source used in step 4) is one or more selected from the group consisting of tetrapropylammonium hydroxide, tetraethylammonium hydroxide, aqueous ammonia, ethylamine, ethylenediamine, n-butylamine, hexamethylenediamine, cyclohexylamine, piperidine, hexamethyleneimine, homopiperazine, and dicyclohexylamine.

In a preferred embodiment, the regulator used in step 4) is one or more selected from the group consisting of hydroxyethylcellulose, hydroxymethylcellulose, hydroxypropylmethylcellulose, methylcellulose, casein, and gum arabic.

In a preferred embodiment, the mass ratios between the third mixture, the alkali source and the regulator in step 4) is as follows: alkali source:third mixture=(0.1-0.4):1, and regulator:third mixture=(0.01-0.05):1.

In a preferred embodiment, the process of contacting the third mixture, the alkali source and the regulator to obtain the fourth mixture in step 4) is carried out by: mixing the alkali source and the regulator while stirring at 30-60° C. for 3-10 hours, then adding thereto the third mixture, and standing for 5-10 hours at 30-60° C. in a closed space.

In a preferred embodiment, the process of treating the fourth mixture to obtain the aluminosilicate molecular sieve catalyst in step 5) is carried out by: subjecting the fourth mixture to standing or stirring for 12-72 hours at 130-190° C. in a closed space, optionally followed by washing, drying, calcinating and acid washing. According to the present application, the washing (e.g. washing with deionized water until the solution has a pH of 7 to 8), drying and calcining can be carried out by conventional ways, for example, the drying conditions may include: a drying temperature of 80-150° C., and a drying time of 5-12 hours; the calcining conditions may include: a calcining temperature of 500-600° C., and a calcining time of 4-10 hours; the conditions for the acid washing may include: an acid washing temperature of 30-90° C., an acid washing time of 2-10 hours, an acid that is at least one of hydrochloric acid, sulfuric acid, oxalic acid or nitric acid, and a mass concentration of the acid solution of 0.5%-5%.

In a preferred embodiment, the properties of the aluminosilicate molecular sieve catalyst obtained by the method of the present application are as described above in the first aspect, and of which a detailed description is omitted herein for brevity.

In a third aspect, the present application provides a process for gas-phase alkylation of an aromatic hydrocarbon with an olefin, comprising the step of subjecting the aromatic hydrocarbon and the olefin to an alkylation reaction in the presence of the catalyst of the present application or a catalyst obtained by the method of the present application, to obtain an alkylaromatic hydrocarbon.

In a preferred embodiment, the aromatic hydrocarbon is selected from benzene, alkylbenzene or a combination thereof, preferably selected from benzene, toluene, ethylbenzene, n-propylbenzene, isopropylbenzene, n-butylbenzene, isobutylbenzene, tert-butylbenzene or a combination thereof; the olefin is selected from C2-C6 olefins, preferably selected from ethylene, propylene, n-butene, isobutylene or a combination thereof.

In a preferred embodiment, the alkylation conditions include: a reaction temperature of 260° C. to 400° C., a reaction pressure of 0.1 to 3.0 MPa, a mass space velocity of the olefin of 0.1 to 10.0 $h^{-1}$, and a molar ratio of the aromatic hydrocarbon to the olefin of 2 to 20.

In a fourth aspect, the present application provides the use of the catalyst according to the present application or a catalyst obtained by the method of the present application for catalyzing the gas-phase alkylation of an aromatic hydrocarbon with an olefin.

EXAMPLES

The present application will be further illustrated in detail with reference to the following examples, but the present application is not limited to those examples.

In the following examples and comparative examples, the XRD pattern of the catalyst was measured using an Ultima IV X-ray powder diffractometer from Rigaku, Japan, with a voltage of 35 kV, a current of 30 mA, and a scanning speed of 1° $min^{-1}$.

In the following examples and comparative examples, the acidity distribution of the catalyst was determined by $NH_3$-TPD test, wherein the $NH_3$-TPD spectrum was obtained using a 200906PX18 Temperature Programmed Desorption Apparatus from Tianjin Golden Eagle Technology Co., Ltd as follows: 0.05-0.20 g of a sample (20-40 meshes) obtained after tabletting and sieving was placed into a quartz sample tube, activated while which is first heated for 1 hours in the helium atmosphere for activation and stabilized for 1 hours, then cooled down to below 40° C., and then heated again to 100° C., subjected to ammonia adsorption at 100° C. until saturation, finally blown with helium for 1 hours, and then subjected to temperature programmed desorption by heating to 600° C. at a rate of 10° C./min, and a working curve was recorded.

In the following examples and comparative examples, the mechanical strength of the catalyst was measured using a smart particle strength tester, in which the mechanical strength of the calcined catalyst was measured using a DLIII Smart Particle Strength Tester from Dalian Penghui Technology Development Co., Ltd by placing the catalyst to be measured horizontally on the tester, measuring the maximum pressure to which the catalyst was subjected when it was broken, and calculating the average value of the crushing strength of 20 measured catalyst particles.

In the following examples and comparative examples, the SEM image was obtained using Hitachi S-4800 Cold Field Emission High Resolution Scanning Electron Microscope from Hitachi, Ltd.). The grain size distribution was obtained based the statistical data for at least 300 grains in the corresponding SEM image by calculating the proportion of the number of grains in a certain grain size range to the total number of the grains.

In the following examples and comparative examples, the $SiO_2/Al_2O_3$ molar ratio of the catalyst was determined by ICP test using Model S-35 ICP-AES Analyzer from Kontron, in which 50 mg of sample was completely dissolved in 50 g of hydrofluoric acid solution before the ICP test.

In the following examples and comparative examples, the isolated aluminum content of the catalyst was measured as follows: firstly, the synthesized catalyst was subjected to ion exchange to obtain a Na-type catalyst, in which the catalyst was mixed with a sodium chloride solution with a concentration of 0.5 mol/L at a solid-liquid mass ratio of 1:100, stirred for 4 hours at room temperature, then drained the solution, the resulting solid was washed with deionized water, the liquid obtained after washing was detected with a silver nitrate solution, and the washing was terminated until no white precipitate was generated in the liquid obtained after washing, thereby obtaining the Na-type catalyst; then, the Na-type catalyst was subjected to $Co^{2+}$ ion exchange, in which the Na-type catalyst was mixed with a cobalt nitrate solution with a concentration of at a solid-liquid mass ratio of 1:200, stirred at room temperature for 10 hours, then drained the solution, the resulting solid was washed with deionized water, the liquid obtained after washing was detected with aqueous ammonia solution, and the washing was terminated until no blue precipitate was generated in the liquid obtained after washing, thereby obtaining a Co-type catalyst. After drying, the Co content and the Al content of the Co-type catalyst was measured by ICP test, and the isolated aluminum content was calculated according to the following equation:

$$\text{Isolated aluminum content}=(1-2\times C_{cobalt}/C_{aluminum})\times 100\%,$$

wherein the $C_{cobalt}$ and $C_{aluminum}$ respectively refer to the Co content and Al content of the Co-type catalyst.

In the following examples and comparative examples, unless otherwise specified, reagents and starting materials used are commercially available products of reagent pure grade.

Example 1

27.7 g of a 40 wt % aqueous tetrapropylammonium hydroxide solution, 60 g of white carbon black, 13.32 g of aluminum sulfate octadecahydrate and 54 g of water were uniformly mixed, and stirred in a closed vessel at 90° C. for 20 hours to obtain a mixture Al. 12 g of the mixture Al, 60 g of silicon powder comprising two types of silica particles with a size in a range of 0.3-1.2 μm and 5-9 μm and present in an amount of 20 g and 40 g, respectively, and 13.32 g of aluminum sulfate octadecahydrate were mixed to obtain a mixture B 1. The mixture B1 was shaped by extrusion molding to obtain a mixture C1 (in a cylindrical shape with a diameter of 1.8 mm and a length of 5 mm). 5 g of ethylamine and 0.5 g of hydroxyethylcellulose were mixed while stirring at 50° C. for 5 hours, and then 50 g of the mixture C1 was added and allowed to stand at 30° C. for 10 hours in a closed space to obtain a mixture D1. The mixture D1 was allowed to stand in a closed space at 130° C. for 72 hours, then washed with deionized water until a pH value of 8 was obtained, dried at 80° C. for 12 hours, calcined at 500° C. for 10 hours, and subjected to acid washing for 5 hours at 60° C. with oxalic acid having a mass concentration of 3%, to obtain an aluminosilicate molecular sieve catalyst E1.

Figure 2:
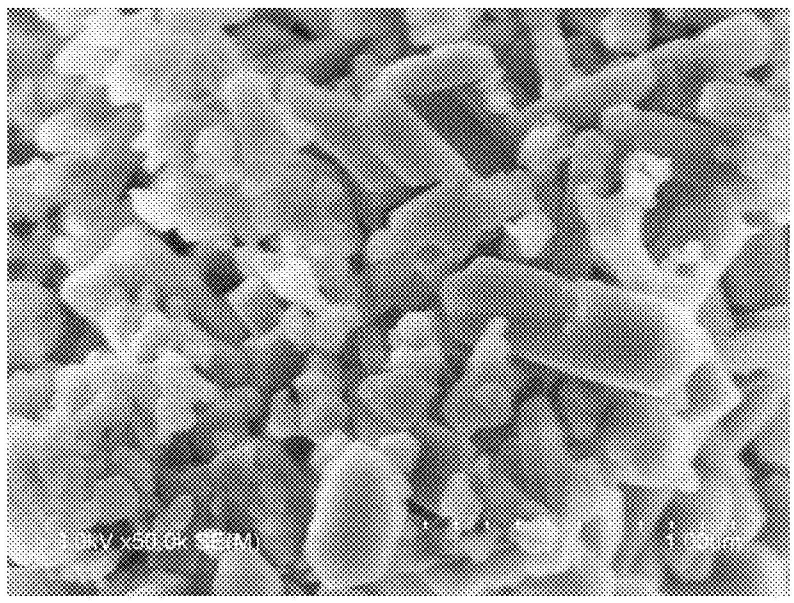
FIG. 2 shows an SEM image of the aluminosilicate molecular sieve catalyst obtained in Example 1 of the present application.
Figure 3:
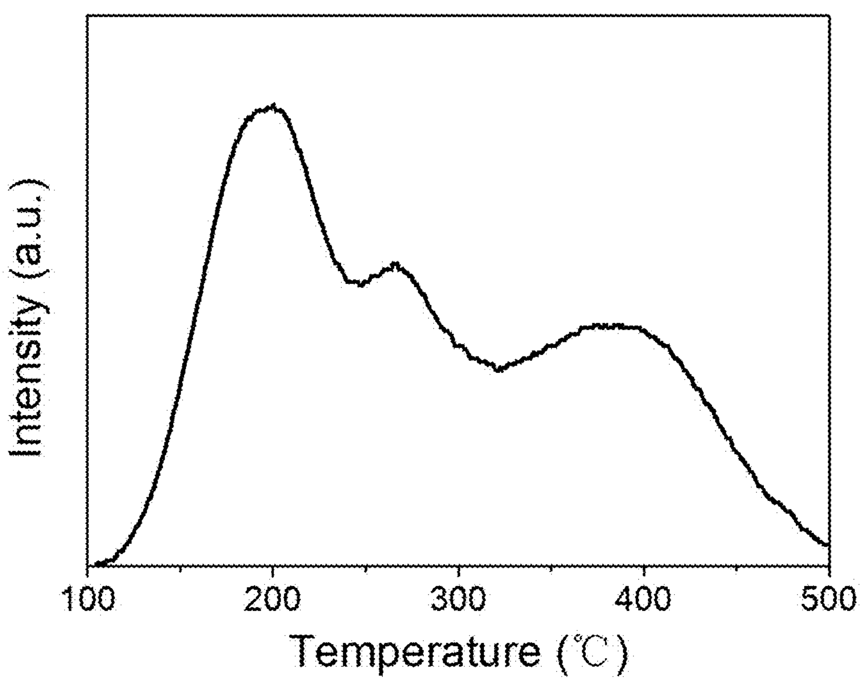
FIG. 3 shows a $NH_3$-TPD pattern of the aluminosilicate molecular sieve catalyst obtained in Example 1 of the present application.

The XRD pattern of the aluminosilicate catalyst E1 is shown in FIG. 1, and has typical diffraction peaks of MFI topological structure, indicating that the catalyst is a ZSM-5 molecular sieve catalyst. The SEM image of the aluminosilicate molecular sieve catalyst E1 is shown in FIG. 2, from which it can be seen that the catalyst comprises two types of crystalline grains of different sizes, the sizes of the two types of crystalline grains are respectively 50-200 nm and 400-1000 nm, and the proportion of number of the two types of crystalline grains is respectively 35% and 65%. The $NH_3$-TPD pattern of the aluminosilicate molecular sieve catalyst E1 is shown in FIG. 3, which shows three peaks designated as P1, P2 and P3 according to the desorption temperature from low to high respectively, the desorption temperatures corresponding to the summits of the three peaks are 196° C., 265° C. and 385° C. respectively, and the ratios between the heights of the three peaks, namely H1, H2 and H3, are as follows: H2/H1=0.66, H3/H2=0.82; H3/H1=0.54; the ratios between the weak acid content S1, the medium-strong acid content S2 and the strong acid content S3 of the catalyst calculated based on the integral areas of the desorption curve within the three temperature ranges of 100-240° C., 240-300° C. and 300-500° C., respectively, are as follows: S2/S1=0.46, S2/S3=0.49, S3/S1=0.94, and correspondingly the proportions of the weak acid content S1, the medium-strong acid content S2 and the strong acid content S3 to the total acid content are 42%, 19% and 39% respectively.

According to the measurement, the aluminosilicate molecular sieve catalyst E1 has a mechanical strength of 155 N/cm, a $SiO_2/Al_2O_3$ molar ratio of 50.8, and an isolated aluminum content of 99.0%.

Example 2

253 g of a 40 wt % aqueous tetrapropylammonium hydroxide solution, 133 g of tetrapropylammonium bromide, 208.3 g of tetraethyl silicate, 2.22 g of aluminum sulfate octadecahydrate and 60 g of water were mixed uniformly, and stirred in a closed vessel at 150° C. for 4 hours to obtain a mixture A2. 48 g of the mixture A2, 60 g of silicon powder comprising two types of silica particles with a size in a range of 1.2-2 μm and 9-12 μm and present in an amount of 30 g and 30 g, respectively, and 1.665 g of aluminum sulfate octadecahydrate were mixed to obtain a mixture B2. The mixture B2 was shaped by extrusion molding to obtain a mixture C2 (in a cylindrical shape with a diameter of 2.2 mm and a length of 5 mm). A mixture of 20 g of cyclohexylamine, 0.5 g of casein and 2 g of hydroxypropylmethylcellulose was stirred at 50° C. for 5 hours, then 50 g of the mixture C2 was added, and allowed to stand at 60° C. for 5 hours in a closed space to obtain a mixture D2. The mixture D2 was allowed to stand in a closed space at 190° C. for 12 hours, then washed with deionized water until a pH value of 7 was obtained, dried for 5 hours at 150° C., calcined for 4 hours at 600° C., and subjected to acid washing for 10 hours at 30° C. with oxalic acid having a mass concentration of 0.5%, to obtain an aluminosilicate molecular sieve catalyst E2.

Figure 4:
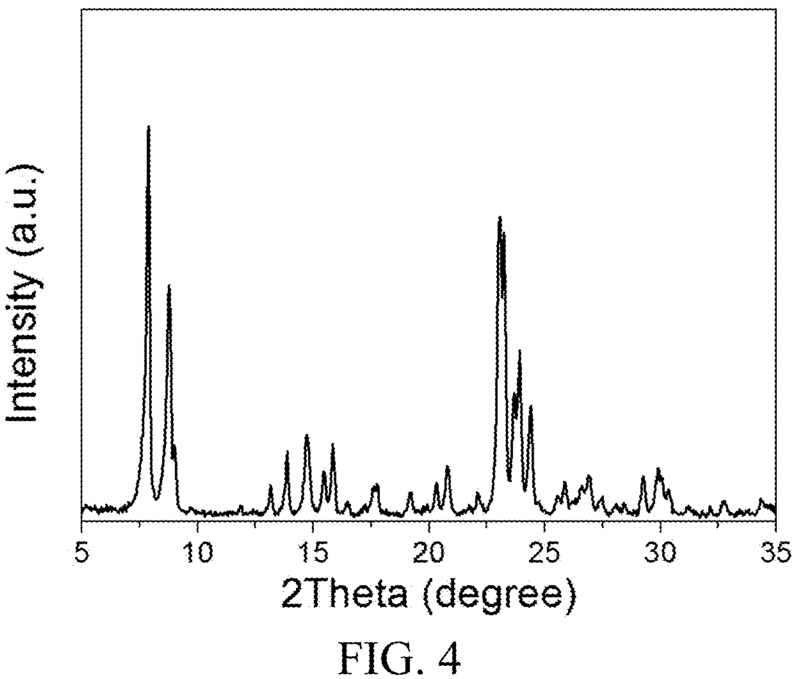
FIG. 4 shows an XRD pattern of the aluminosilicate molecular sieve catalyst obtained in Example 2 of the present application.

The XRD pattern of the aluminosilicate catalyst E2 is shown in FIG. 4, which has typical diffraction peaks of MFI topological structure, indicating that the catalyst is a ZSM-5 molecular sieve catalyst. The SEM image of the aluminosilicate molecular sieve catalyst E2 shows that the catalyst comprises two types of crystalline grains of different sizes, and the sizes of the two types of crystalline grains are respectively 250-300 nm and 1000-1600 nm according to the statistical analysis, and the proportion of number of the two types of crystalline grains is respectively 40% and 60%. The $NH_3$-TPD pattern of the aluminosilicate molecular sieve catalyst E2 shows three peaks designated as P1, P2 and P3 respectively according to the desorption temperature from low to high, the desorption temperatures corresponding to the summits of the three peaks are 191° C., 260° C. and 381° C., respectively, and the ratios between the heights of the three peaks, namely H1, H2 and H3, are as follows: H2/H1=0.51, H3/H2=0.80, H3/H1=0.41; the ratios between the weak acid content S1, the medium-strong acid content S2 and the strong acid content S3 of the catalyst calculated based on the integral areas of the desorption curve within the three temperature ranges of 100-240° C., 240-300° C. and 300-500° C. respectively are as follows: S2/S1=0.48, S2/S3=0.52, S3/S1=0.92, and correspondingly the proportions of the weak acid content S1, the medium-strong acid content S2 and the strong acid content S3 to the total acid content are 42%, 20% and 38% respectively.

According to the measurement, the aluminosilicate molecular sieve catalyst E2 has a mechanical strength of 112 N/cm, a $SiO_2/Al_2O_3$ molar ratio of 398, and an isolated aluminum content of 99.6%.

Example 3

126 g of a 40 wt % aqueous tetrapropylammonium hydroxide solution, 66 g of tetrapropylammonium bromide, 208.3 g of tetraethyl silicate, 6.66 g of aluminum sulfate octadecahydrate and 50 g of water were mixed uniformly and stirred in a closed vessel at 120° C. for 12 hours to obtain a mixture A3.24 g of the mixture A3, 60 g of silicon powder comprising two types of silica particles with a size in a range of 0.1-0.3 μm and 4-7 μm and present in an amount of 40 g and 20 g, respectively, and 6.66 g of aluminum sulfate octadecahydrate were mixed to obtain a mixture B3. The mixture B3 was shaped by extrusion molding to obtain a mixture C3 (in a cylindrical shape with a diameter of 1.2 mm and a length of 5 mm). 10 g of n-butylamine and 1.5 g of gum arabic were mixed while stirring at 50° C. for 5 hours, and then 50 g of the mixture C3 was added thereto and allowed to stand at 40° C. for 7 hours in a closed space to obtain a mixture D3. The mixture D3 was allowed to stand in a closed space at 170° C. for 36 hours, then washed with deionized water until a pH value of 7.5 was obtained, dried at 100° C. for 8 hours, calcined at 550° C. for 6 hours, and subjected to acid washing at 60° C. for 6 hours with hydrochloric acid having a mass concentration of 3%, to obtain an aluminosilicate molecular sieve catalyst E3.

Figure 5:
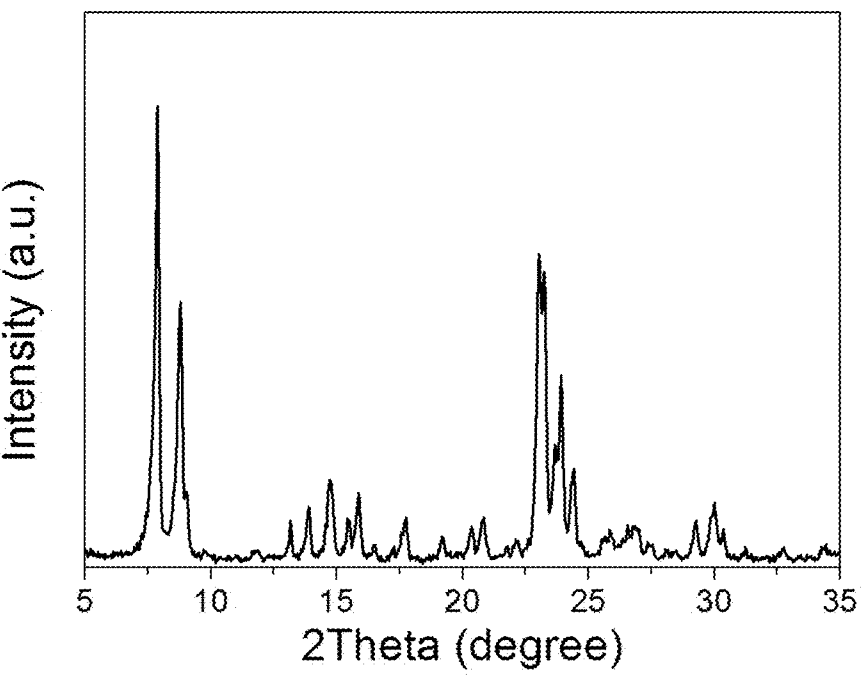
FIG. 5 shows an XRD pattern of the aluminosilicate molecular sieve catalyst obtained in Example 3 of the present application.

The XRD pattern of the aluminosilicate catalyst E3 is shown in FIG. 5, which has typical diffraction peaks of MFI topological structure, indicating that the catalyst is a ZSM-5 molecular sieve. The SEM image of the aluminosilicate molecular sieve catalyst E3 shows that the catalyst comprises two types of crystalline grains of different sizes, and the sizes of the two types of crystalline grains are respectively 10-100 nm and 400-700 nm according to the statistical analysis, and the proportion of number of the two types of crystalline grains is respectively 56% and 44%. The $NH_3$-TPD pattern of the aluminosilicate molecular sieve catalyst E3 shows three peaks designated as P1, P2 and P3 respectively according to the desorption temperature from low to high, the desorption temperatures corresponding to the summits of the three peaks are 208° C., 277° C. and 399° C., respectively, and the ratios between the heights of the three peaks, namely H1, H2 and H3, are as follows: H2/H1=0.79, H3/H2=0.89, H3/H1=0.70; the ratios between the weak acid content $S_1$, the medium-strong acid content S2 and the strong acid content S3 of the catalyst calculated based on the integral areas of the desorption curve within the three temperature ranges of 100-240° C., 240-300° C. and 300-500° C. respectively are as follows: S2/S1=0.41, S2/S3=0.38, S3/S1=1.07, and correspondingly the proportions of the weak acid content S1, the medium-strong acid content S2 and the strong acid content S3 to the total acid content are 40%, 17% and 43%, respectively.

According to the measurement, the aluminosilicate molecular sieve catalyst E3 has a mechanical strength of 145 N/cm, a $SiO_2/Al_2O_3$ molar ratio of 125, and an isolated aluminum content of 99.2%.

Comparative Example 1

A catalyst was prepared as described in Example 3, except that silicon powder comprising only one type of silica particles have a size in a range of 0.1 to 0.3 μm was used, and no regulator was added in step 4). The catalyst was prepared as follows: 126 g of a 40 wt % aqueous tetrapropylammonium hydroxide solution, 66 g of tetrapropylammonium bromide, 208.3 g of tetraethyl silicate, 6.66 g of aluminum sulfate octadecahydrate and 50 g of water were mixed uniformly and stirred in a closed vessel at 120° C. for 12 hours to obtain a mixture A4. 24 g of the mixture A4, 60 g of silicon powder comprising only one type of silica particles have a size in a range of 0.1 to 0.3 μm, 6.66 g of aluminum sulfate octadecahydrate were mixed to obtain a mixture B4. The mixture B4 was shaped by extrusion molding to obtain a mixture C4 (in a cylindrical shape with a diameter of 1.2 mm and a length of 5 mm). 10 g of n-butylamine was stirred at 50° C. for 5 hours, then 50 g of the mixture C4 was added thereto, and the mixture was allowed to stand at 40° C. for 7 hours in a closed space to obtain a mixture D4. The mixture D4 was allowed to stand in a closed space at 170° C. for 36 hours, then washed with deionized water until a pH value of 7.5 was obtained, dried for 8 hours at 100° C., calcined for 6 hours at 550° C., and subjected to acid washing for 6 hours at 60° C. with hydrochloric acid having a mass concentration of 3% to obtain an aluminosilicate molecular sieve catalyst F1.

Figure 6:
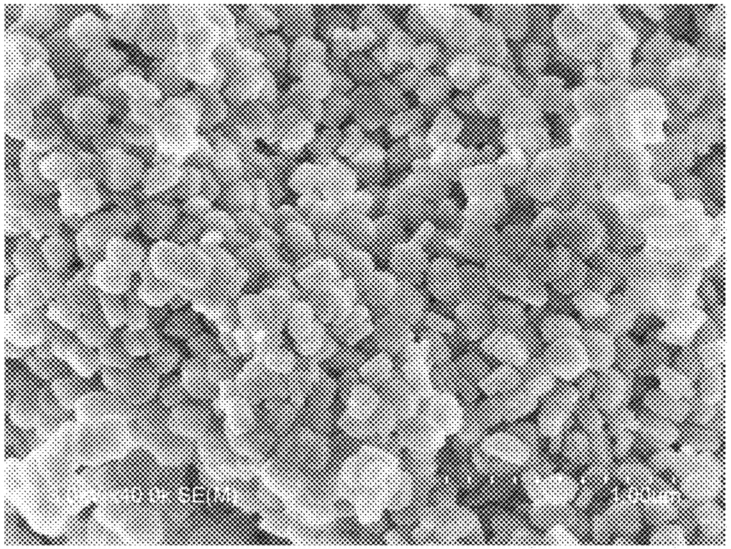
FIG. 6 shows an SEM image of the aluminosilicate molecular sieve catalyst obtained in Comparative Example 1.
Figure 7:
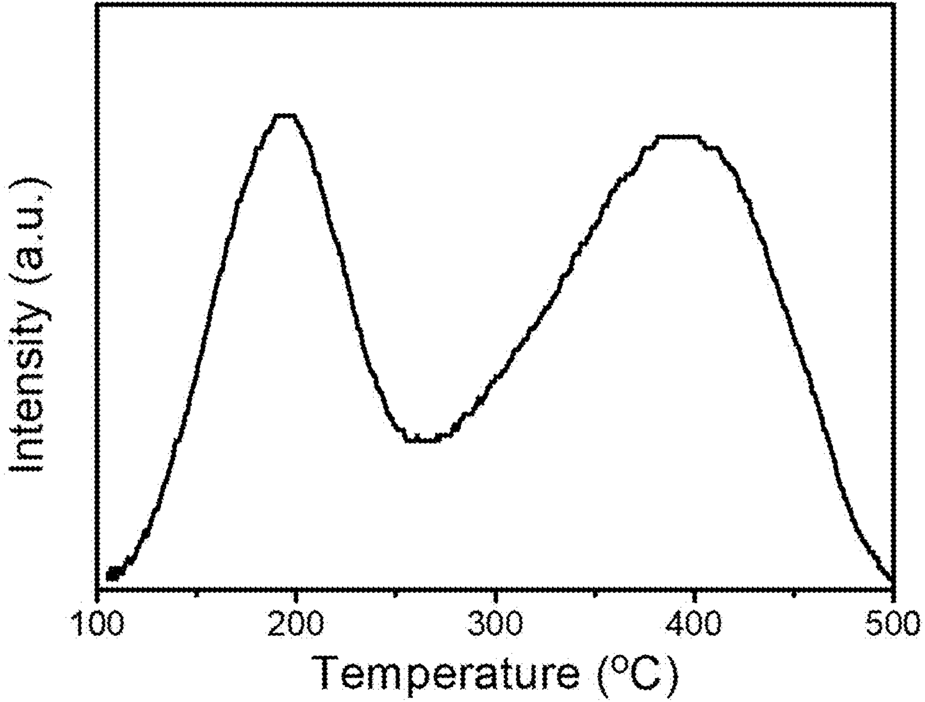
FIG. 7 shows a $NH_3$-TPD pattern of the aluminosilicate molecular sieve catalyst obtained in Comparative Example 1.

The SEM image of the aluminosilicate molecular sieve catalyst F1 is shown in FIG. 6, from which it can be seen that the catalyst comprises only one type of crystalline grains having a size in a range of 180-250 nm according to the statistical analysis. The $NH_3$-TPD pattern of the aluminosilicate molecular sieve catalyst F1 is shown in FIG. 7, which shows two peaks respectively designated as P1 and P2 according to the desorption temperature from low to high, the desorption temperatures corresponding to the summits of the two peaks are 194° C. and 396° C., respectively, and the ratio of the heights of the two peaks, namely H1 and H2, is as follows: H2/H1=0.96, and the ratios between the weak acid content S1, the medium-strong acid content S2 and the strong acid content S3 of the catalyst calculated based on the integral areas of the desorption curve within the three temperature ranges of 100-240° C., 240-300° C. and 300-500° C. respectively are as follows: S2/S1=0.28, S2/S3=0.17, S3/S1=1.63, and correspondingly the proportions of the weak acid content S1, the medium-strong acid content S2 and the strong acid content S3 to the total acid content are 34%, 10% and 56% respectively.

According to the measurement, the aluminosilicate molecular sieve catalyst F1 has a mechanical strength of 155 N/cm, a $SiO_2/Al_2O_3$ molar ratio of 128, and an isolated aluminum content of 95.8%.

Comparative Example 2

A catalyst was prepared as described in Example 1, except that the order of addition of the regulator hydroxyethylcellulose was changed. The catalyst was prepared as follows: 27.7 g of a 40 wt % aqueous tetrapropylammonium hydroxide solution, 60 g of white carbon black, 13.32 g of aluminum sulfate octadecahydrate, 54 g of water and 0.5 g of hydroxyethylcellulose were uniformly mixed, and stirred in a closed vessel at 90° C. for 20 hours, to obtain a mixture A5. 12 g of the mixture A5, 60 g of silicon powder comprising two types of silica particles with a size in a range of 0.3-1.2 μm and 5-9 μm and present in an amount of 20 g and 40 g, respectively, and 13.32 g of aluminum sulfate octadecahydrate were mixed to obtain a mixture B5. The mixture B5 was shaped by extrusion molding to obtain a mixture C5 (in a cylindrical shape with a diameter of 1.8 mm and a length of 5 mm). 5 g of ethylamine was stirred at 50° C. for 5 hours, and then 50 g of the mixture C5 was added thereto, allowed to stand at 30° C. for 10 hours in a closed space to obtain a mixture D5. The mixture D5 was allowed to stand in a closed space at 130° C. for 72 hours, then washed with deionized water until a pH value of 8 was obtained, dried at 80° C. for 12 hours, calcined at 500° C. for 10 hours, and subjected to acid washing for 5 hours at 60° C. with oxalic acid having a mass concentration of 3%, to obtain an aluminosilicate molecular sieve catalyst F2.

The SEM image of the aluminosilicate molecular sieve catalyst F2 shows that the catalyst comprises two types of crystalline grains of different sizes, and the sizes of the two types of crystalline grains are respectively 200-420 nm and 1500-2000 nm according to the statistical analysis. The $NH_3$-TPD pattern of the aluminosilicate molecular sieve catalyst F2 shows two peaks designated as P1 and P2 respectively according to the desorption temperature from low to high, the desorption temperatures corresponding to the summits of the two peaks are 197° C. and 399° C., respectively, and the ratio of the heights of the two peaks, namely H1 and H2, is as follows: H2/H1=0.76; the ratios between the weak acid content S1, the medium-strong acid content S2 and the strong acid content S3 of the catalyst calculated based on the integral areas of the desorption curve within the three temperature ranges of 100-240° C., 240-300° C. and 300-500° C., respectively, are as follows: S2/S1=0.26, S2/S3=0.16, S3/S1=1.60, the proportions of the weak acid content S1, the medium-strong acid content S2 and the strong acid content S3 to the total acid content are 35%, 9% and 56% respectively.

According to the measurement, the aluminosilicate molecular sieve catalyst F2 has a mechanical strength of 135 N/cm, a $SiO_2/Al_2O_3$ molar ratio of 52.4, and an isolated aluminum content of 96.6%.

Comparative Example 3

A catalyst was prepared as described in Example 3, except that silicon powder comprising only one type of silica particles with a size in a range of 0.1 to 0.3 μm was used. The catalyst was prepared as follows: 126 g of a 40 wt % aqueous tetrapropylammonium hydroxide solution, 66 g of tetrapropylammonium bromide, 208.3 g of tetraethyl silicate, 6.66 g of aluminum sulfate octadecahydrate and 50 g of water were mixed uniformly and stirred in a closed vessel at 120° C. for 12 hours to obtain a mixture A6. 24 g of the mixture A6, 60 g of silicon powder comprising only one type of silica particles with a size in a range of 0.1-0.3 μm, 6.66 g of aluminum sulfate octadecahydrate were mixed to obtain a mixture B6. The mixture B6 was shaped by extrusion molding to obtain a mixture C6 (in a cylindrical shape with a diameter of 1.2 mm and a length of 5 mm). 10 g of n-butylamine and 1.5 g of gum arabic were stirred at 50° C. for 5 hours, then 50 g of the mixture C6 was added, and allowed to stand at 40° C. for 7 hours in a closed space to obtain a mixture D6. The mixture D6 was allowed to stand in a closed space at 170° C. for 36 hours, then washed with deionized water until a pH value of 7.5 was obtained, dried for 8 hours at 100° C., calcined for 6 hours at 550° C., and subjected to acid washing for 6 hours at 60° C. with hydrochloric acid having a mass concentration of 3%, to obtain an aluminosilicate molecular sieve catalyst F3.

The SEM image of the aluminosilicate catalyst F3 shows that the catalyst comprises only one type of crystalline grains having a size in a range of 170-245 nm according to the statistical analysis. The $NH_3$-TPD pattern of the aluminosilicate molecular sieve catalyst F3 shows two peaks designated as P1 and P2 respectively according to the desorption temperature from low to high, the desorption temperatures corresponding to the summits of the two peaks are 189° C. and 366° C., respectively, and the ratio of the heights of the two peaks, namely H1 and H2, is as follows: H2/H1=0.76; the ratios of the weak acid content S1, the medium-strong acid content S2 and the strong acid content S3 of the catalyst calculated based on the integral areas of the desorption curve within the three temperature ranges of 100-240° C., 240-300° C. and 300-500° C., respectively, are as follows: S2/S1=0.43, S2/S3=0.35, S3/S1=1.23, and correspondingly the proportions of the weak acid content S1, the medium-strong acid content S2 and the strong acid content S3 to the total acid content are 38%, 16% and 46% respectively.

According to the measurement, the aluminosilicate molecular sieve catalyst F3 has a mechanical strength of 142 N/cm, a $SiO_2/Al_2O_3$ molar ratio of 126, and an isolated aluminum content of 97.3%.

Comparative Example 4

A catalyst was prepared according to the method of CN 107512729A as follows:

Preparation of synthesized ZSM-5 molecular sieve: alkaline silica sol, aluminum sulfate octadecahydrate, tetrapropylammonium hydroxide (TPAOH) and water were used as raw materials, and the raw materials were mixed uniformly at molar ratios of $SiO_2/Al_2O_3$=180, TPAOH/$SiO_2$=0.22, $H_2O/SiO_2$=18, loaded into a stainless steel reaction kettle, and crystallized at 150° C. for 3 days under stirring. After the completion of crystallization, the resultant was filtered, washed and dried to obtain the synthesized ZSM-5 molecular sieve.

Preparation of ZSM-5 molecular sieve precursor: 41.866 g of the synthesized ZSM-5 molecular sieve, 37.5 g of alkaline silica sol (with a $SiO_2$ content of 40.0 wt %), 0.5616 g of methylcellulose and a 5 wt % aqueous nitric acid solution were uniformly mixed, and extruded into strips with a section of four-leaf clover shape, a diameter of 1.2 mm and a length of 5 mm, to obtain a molecular sieve precursor comprising 70 wt % of ZSM-5 molecular sieve.

Preparation of a targeted catalyst: 1.97 g of sodium aluminate (comprising 43.0 wt % of $Al_2O_3$, 35.0 wt % of $Na_2O$), 247 g of water, 8.865 g of n-butylamine (with a concentration of 99.0 wt %) were uniformly mixed, and then mixed with all of the molecular sieve precursor obtained above, and the resulting mixture was crystallized at 150° C. for 28 hours. After the completion of the crystallization, the resultant was filtered, washed, dried, calcined at 550° C. in air for 5 h, subjected to ammonium exchange with 10 wt % ammonium sulfate solution for 3 times, and calcined at 550° C. in air for 5 h to obtain a binderless ZSM-5 molecular sieve catalyst F4.

The SEM image of the catalyst F4 shows that the catalyst comprises only one type of crystalline grains having a size in a range of 300-450 nm according to the statistical analysis. The $NH_3$-TPD pattern of the catalyst F4 shows two peaks designated as P1 and P2 respectively according to the desorption temperature from low to high, the desorption temperatures corresponding to the summits of the two peaks are 193° C. and 390° C. respectively, and the ratio of the heights of the two peaks, namely H1 and H2, is as follows: H2/H1=1.21; the ratios between the weak acid content S1, the medium-strong acid content S2 and the strong acid content S3 of the catalyst calculated based on the integral areas of the desorption curve within the three temperature ranges of 100-240° C., 240-300° C. and 300-500° C., respectively, are as follows: S2/S1=0.37, S2/S3=0.18, S3/S1=2.03, and correspondingly the proportions of the weak acid content S1, the medium-strong acid content S2 and the strong acid content S3 to the total acid content are 29%, 11% and 60%, respectively.

According to the measurement, the catalyst F4 has a mechanical strength of 78 N/cm, a $SiO_2/Al_2O_3$ molar ratio of 145, and an isolated aluminum content of 93.7%.

TABLE 1

Properties of the catalysts obtained in the examples and comparative examples

| Catalyst No. | E1 | E2 | E3 | F1 | F2 | F3 | F4 |
|---|---|---|---|---|---|---|---|
| Size of first type of crystalline grains/nm | 50-200 | 250-300 | 10-100 | 180-250 | 200-420 | 170-245 | 300-450 |
| Size of second type of crystalline grains/nm | 400-1000 | 1000-1600 | 400-700 | — | 1500-2000 | — | — |
| Temperature of Peak P1/° C. | 196 | 191 | 208 | 194 | 197 | 189 | 193 |
| Temperature of Peak P2/° C. | 265 | 260 | 277 | 396 | 399 | 366 | 390 |
| Temperature of Peak P3/° C. | 385 | 381 | 399 | — | — | — | — |
| H2/H1 | 0.66 | 0.51 | 0.79 | 0.96 | 0.76 | 0.76 | 1.21 |
| H3/H2 | 0.82 | 0.80 | 0.89 | — | — | — | — |
| H3/H1 | 0.54 | 0.41 | 0.70 | — | — | — | — |
| S2/S1 | 0.46 | 0.48 | 0.41 | 0.28 | 0.26 | 0.43 | 0.37 |
| S2/S3 | 0.49 | 0.52 | 0.38 | 0.17 | 0.16 | 0.35 | 0.18 |
| S3/S1 | 0.94 | 0.92 | 1.07 | 1.63 | 1.60 | 1.23 | 2.03 |
| Proportion of weak acid content S1/% | 42 | 42 | 40 | 34 | 35 | 38 | 29 |
| Proportion of medium-strong acid content S2/% | 19 | 20 | 17 | 10 | 9 | 16 | 11 |
| Proportion of strong acid content S3/% | 39 | 38 | 43 | 56 | 56 | 46 | 60 |
| Isolated aluminum content/% | 99.0 | 99.6 | 99.2 | 95.8 | 96.6 | 97.3 | 93.7 |
| Mechanical Strength/N/cm | 155 | 112 | 145 | 155 | 135 | 142 | 78 |
| $SiO_2/Al_2O_3$ molar ratio | 50.8 | 398 | 125 | 128 | 52.4 | 126 | 145 |

As can be seen from the data in Table 1, the grain size of the catalyst of the present application has a bimodal distribution, and the $NH_3$-TPD desorption curve of which shows three distinct peaks. Compared with the catalysts obtained in the comparative examples, the catalyst of the present application shows a significantly different acidity distribution, particularly the proportion of the medium-strong acid content is significantly improved, and meanwhile, the proportion of the strong acid content is reduced while the proportion of the weak acid content is improved.

Test Example 1

The aluminosilicate molecular sieve catalysts E1-E3 obtained in Examples 1-3 and the catalysts F1-F4 obtained in Comparative Examples 1-4 were respectively applied to a gas-phase alkylation reaction of benzene with ethylene, and the reaction was conducted for 10 hours under the conditions including a reaction temperature of 380° C., a reaction pressure of 1.5 MPa, an ethylene mass space velocity of 2.2 $h^{-1}$ and a molar ratio of benzene to ethylene of 5.5, and the xylene content, the diethylbenzene and triethylbenzene content in the alkylation product were detected, and the ethylene conversion and the ethyl selectivity were calculated. The reaction results are shown in Table 2 below, wherein:

Ethylene conversion=(total input amount of ethylene−amount of ethylene in reactor effluent)/total input amount of ethylene×100%

Ethyl selectivity=(moles of ethylbenzene produced+moles of diethylbenzene×2+moles of triethylbenzene×3)/moles of ethylene consumed×100%

TABLE 2

Results of the gas-phase alkylation of benzene with ethylene

| Catalyst No. | Mass content of xylene, ppm | Content of diethylbenzene and triethylbenzene, wt. % | Ethylene conversion, % | Ethyl selectivity, % |
|---|---|---|---|---|
| E1 | 498 | 7.9 | 99.6 | 99.4 |
| E2 | 310 | 6.2 | 99.8 | 99.6 |
| E3 | 426 | 7.1 | 99.5 | 99.5 |
| F1 | 760 | 12.1 | 98.7 | 98.9 |
| F2 | 820 | 12.6 | 98.9 | 98.4 |
| F3 | 580 | 10.3 | 99.1 | 99.2 |
| F4 | 946 | 14.8 | 97.5 | 98.1 |

Test Example 2

The single-pass lifetime of the aluminosilicate molecular sieve catalysts E1-E3 obtained in Examples 1-3 and the catalysts F1-F4 obtained in Comparative Examples 1-4 in the gas-phase alkylation reaction of benzene with ethylene was respectively tested under reaction conditions involving an ultrahigh ethylene space velocity, wherein the detailed conditions included a reaction temperature of 400° C., a pressure of 2.0 MPa, an ethylene mass space velocity of 6 $h^{-1}$, and a molar ratio of benzene to ethylene of 2. The single-pass lifetime refers to the time period from the beginning of the reaction to the time when the ethylene conversion is reduced to 60% of the initial conversion. The reaction results are shown in Table 3 below.

TABLE 3

Results of the single-pass lifetime test of the catalyst under ultrahigh space velocity conditions

| Catalyst No. | Single-pass lifetime, h |
|---|---|
| E1 | 240 |
| E2 | 282 |
| E3 | 256 |
| F1 | 175 |
| F2 | 146 |
| F3 | 155 |
| F4 | 123 |

As shown in the data of Table 2, compared with the catalysts obtained in the comparative examples, the catalyst of the present application shows a higher activity and selectivity in the alkylation reaction of aromatics with olefins, and can significantly reduce the content of byproducts and improve the conversion of olefin and the selectivity of product. Particularly, in the reaction for producing ethylbenzene through alkylation of benzene with ethylene, the mass content of the key impurity xylene in the resulting alkylation product can be reduced to a level below 500 ppm, and the mass content of diethylbenzene and triethylbenzene can be reduced to a level below 8%.

As shown in the data of Table 3, compared with the catalysts obtained in the comparative examples, the catalyst of the present application shows a higher stability in the gas-phase alkylation of benzene with ethylene under reaction conditions involving an ultrahigh ethylene space velocity, and a significantly increased single-pass lifetime.

The present application is illustrated in detail hereinabove with reference to preferred embodiments, but is not intended to be limited to those embodiments. Various modifications may be made following the inventive concept of the present application, and these modifications shall be within the scope of the present application.

It should be noted that the various technical features described in the above embodiments may be combined in any suitable manner without contradiction, and in order to avoid unnecessary repetition, various possible combinations are not described in the present application, but such combinations shall also be within the scope of the present application.

In addition, the various embodiments of the present application can be arbitrarily combined as long as the combination does not depart from the spirit of the present application, and such combined embodiments should be considered as the disclosure of the present application.

The invention claimed is:

1. An aluminosilicate molecular sieve catalyst having a desorption curve having three peaks P1, P2 and P3 in $NH_3$-TPD pattern thereof, and desorption temperatures corresponding to the summits of the three peaks P1, P2, and P3 are in a range of 180-220° C., 250-290° C., and 370-410° C., respectively, wherein the aluminosilicate molecular sieve is a ZSM-5 molecular sieve, and wherein peaks P1, P2 and P3 have peak heights H1, H2, and H3, respectively, and H1>H2>H3.

2. The catalyst according to claim 1, wherein

S2/S1=(0.38-0.52):1;

S2/S3=(0.32-0.58):1; and

S3/S1=(0.8-1.2):1, wherein S1, S2, and S3 represent a weak acid content, a medium-strong acid content, and a strong acid content, respectively, and the weak acid content S1, the medium-strong acid content S2, and the strong acid content S3 are calculated based on integral areas under the desorption curve within the temperature ranges of 100-240° C., 240-300° C., and 300-500° C. in the $NH_3$-TPD pattern of the catalyst, respectively.

3. The catalyst according to claim 1, wherein a percentage of the weak acid content S1 to a total acid content of the catalyst is 40-50%, a percentage of the medium-strong acid content S2 to the total acid content is 15-25%, and a percentage of the strong acid content S3 to the total acid content is 35-45%, wherein the weak acid content S1, the medium-strong acid content S2, and the strong acid content S3 are represented by integral areas of the desorption curve within the temperature ranges of 100-240° C., 240-300° C., and 300-500° C. in the $NH_3$-TPD pattern of the catalyst, respectively, and wherein the total acid content of the catalyst is represented by the total integral area of the desorption curve in the temperature range of 100-500° C. in the $NH_3$-TPD pattern of the catalyst.

4. The catalyst according to claim 3, further comprising super acid sites, and a percentage of the super acid content to the total acid content of the catalyst is less than 5%; wherein the super acid content is represented by the integral area under the desorption curve in a temperature range of more than 500° C. in the $NH_3$-TPD pattern of the catalyst.

5. A method for producing the aluminosilicate molecular sieve catalyst according to claim 1, comprising the steps of:

1) Mixing a template, a silicon source, a first aluminum source and water while heating to obtain a first mixture;

2) mixing the first mixture, silicon powder and a second aluminum source to obtain a second mixture;

3) Shaping the second mixture to obtain a third mixture;

4) Contacting the third mixture, an alkali source, and a regulator to obtain a fourth mixture, wherein the regulator is a polyhydroxy high molecular compound selected from the group consisting of hydroxyethylcellulose, hydroxymethylcellulose, hydroxypropylmethylcellulose, methylcellulose, casein, gum arabic, or any combination thereof; and 5) treating the fourth mixture to obtain the aluminosilicate molecular sieve catalyst, wherein the treatment comprises calcining.

6. The method according to claim 5, wherein the step 1) has one or more of the following characteristics:

the template is selected from tetrapropylammonium hydroxide, tetrapropylammonium bromide, tetraethylammonium hydroxide, tetraethylammonium bromide or a combination thereof, the silicon source is selected from silica sol, white carbon black, tetraethyl silicate, silicon powder or a combination thereof, and the first aluminum source is selected from aluminum chloride, aluminum nitrate, aluminum sulfate, aluminum isopropoxide, pseudo-boehmite or a combination thereof;

the molar ratios between the template, the silicon source, the first aluminum source and water satisfy: template: silicon source=(0.05-1.0): 1, silicon source: first aluminum source=(30-400): 1, and water: silicon source=(3-12): 1, wherein the silicon source is calculated as $SiO_2$, and the first aluminum source is calculated as $Al_2O_3$; and the mixing while heating in step 1) comprises the step of mixing the template, the silicon source, the first aluminum source and water while stirring in a closed container for 4-20 h at a temperature of 90-150° C.

7. The method according to claim 5, wherein the step 2) has one or more of the following characteristics:

the silicon powder comprises two types of silica particles having different sizes, the sizes of the silica particles are respectively 0.1-2 um and 4-12 um, and the mass ratio of the two types of silica particles is (0.5-2.0):1;

the second aluminum source is selected from aluminum chloride, aluminum nitrate, aluminum sulfate, aluminum alkoxide, pseudo-boehmite, aluminum hydroxide or a combination thereof; and the ratios between the first mixture, the silicon powder and the second aluminum source satisfy: the weight ratio of the first mixture to the silicon powder is (0.2-0.8): 1; the molar ratio of the silicon powder to the second aluminum source is (30-400): 1; wherein the silicon powder is calculated as $SiO_2$, and the second aluminum source is calculated as $Al_2O_3$.

8. The method according to claim 5, wherein the step 4) has one or more of the following characteristics:

the alkali source is selected from tetrapropylammonium hydroxide, tetraethylammonium hydroxide, ammonia water, ethylamine, ethylenediamine, n-butylamine, hexamethylenediamine, cyclohexylamine, piperidine, hexamethyleneimine, homopiperazine, dicyclohexylamine, or a combination thereof;

the mass ratios between the third mixture, the alkali source and the regulator satisfy: alkali source: third mixture=(0.1-0.4): 1; and regulator: third mixture=(0.01-0.05): 1; and the contacting of step 4) comprises mixing the alkali source and the regulator at 30-60° C. for 3-10 hours while stirring, then adding the third mixture, and standing in a closed space at 30-60° C. for 5-10 hours.

9. The method according to claim 5, wherein the treatment of step 5) comprises subjecting the fourth mixture to standing or stirring 130-190° C. for 12-72 hours in a closed space, followed by washing, drying, calcining and acid washing.

10. A process for gas-phase alkylation of an aromatic hydrocarbon with an olefin, comprising the step of contacting the aromatic hydrocarbon with the olefin for alkylation reaction in the presence of the catalyst according to claim 1, to obtain an alkylaromatic hydrocarbon.

11. The process according to claim 10, wherein the aromatic hydrocarbon is selected from benzene, alkylbenzene or a combination thereof, wherein the alkylbenzene is selected from toluene, ethylbenzene, n-propylbenzene, isopropylbenzene, n-butylbenzene, isobutylbenzene, and tert-butylbenzene; the olefin is selected from C2-C6 olefins selected from ethylene, propylene, n-butene, isobutylene, or a combination thereof; the alkylation conditions include: a reaction temperature of 260-400° C., a reaction pressure of 0.1-3.0 MPa, a mass space velocity of the olefin of 0.1-10.0 $h^{-1}$, and a molar ratio of the aromatic hydrocarbon to the olefin of 2-20.

12. The catalyst according to claim 1, wherein the desorption temperatures corresponding to the summits of the three peaks P1, P2 and P3 are respectively in the ranges of 190-210° C., 260-280° C., and 380-400° C., respectively.

13. The catalyst according to claim 1, wherein

H2/H1=(0.5-0.8): 1;

H3/H2=(0.8-0.9): 1; and

H3/H1=(0.4-0.7): 1.

14. The catalyst according to claim 2, wherein the weak acid content S1, the medium-strong acid content S2 and the strong acid content S3 of the catalyst satisfy the following relationship:

S2/S1=(0.4-0.5):1;

S2/S3=(0.35-0.55):1; and

S3/S1=(0.9-1.1):1.

15. The catalyst according to claim 1, wherein no additional modifying metallic or non-metallic component is supported on the catalyst.

16. The catalyst according to claim 1, comprising crystalline grains of different sizes, the number of crystalline grains having a size of 10-300 nm accounts for 5-60% of the total number of the crystalline grains, and the number of crystalline grains having a size of 400-1600 nm accounts for 40-95% of the total number of the crystalline grains.

17. The catalyst according to claim 1, wherein the catalyst has an isolated aluminum content of 97.5-100%;

the catalyst has a mechanical strength of 100-170N/cm; and/or the catalyst has a $SiO_2/Al_2O_3$ molar ratio of 30-400.

* * * * *